Nov. 23, 1948.

A. U. PETERSON ET AL 2,454,744

MULTIPLE TOGGLE CLAMPING MEANS FOR VISES AND THE LIKE

Filed June 7, 1945

INVENTORS.
ANTON U. PETERSON.
AUGUST J. MEYER.

BY Albert C. Bell

ATTORNEY.

Patented Nov. 23, 1948

2,454,744

UNITED STATES PATENT OFFICE 2,454,744

MULTIPLE TOGGLE CLAMPING MEANS FOR VISES AND THE LIKE

Anton U. Peterson, Chicago, and August J. Meyer, River Forest, Ill.; said Meyer assignor to said Peterson Application June 7, 1945, Serial No. 597,992

5 Claims. (Cl. 81—26)

Our invention pertains to clamping means for vises and any similar clamp structures including relatively movable jaws for receiving and holding articles to be worked on, whatever may be the nature of the articles, and whether the work on the articles is to be done manually or in suitable machines.

By our invention the clamping means for the jaws of the clamp structure, include toggle links interconnected and connected with a movable jaw member and with the base of the clamp structures, together with suitable devices for operating the toggle links, so that a thrust may be produced on the movable jaw member that is many times greater than the force exerted on the operating devices. Our invention further provides a structure for changing as desired, the spacing of the jaw members for the released condition thereof, to receive work pieces of different sizes, and also pressure adjusting devices by which the clamping pressure exerted by the jaw members with the operating devices in operated condition may be positively and accurately regulated to meet the requirements of any particular case, so that the clamping pressure may be suited to hard and resistant work pieces in one case and to fragile and delicate work pieces in another case. In one form of the mechanism, the pressure adjusting devices of the invention are in two parts, a first part arranged to quickly secure the major portion of a desired pressure adjustment accompanied by a relatively large range of adjusting movement, and a second part arranged to accurately secure by minute increments exactly the desired clamping pressure of the jaw members through a relatively small range of adjusting movement.

The operating devices of the invention are arranged to be operated by a single application of operating force in a single direction, to accomplish which, in the preferred embodiment of the invention, a first tension rod is employed and operated by a single tensional force, for example by a first foot pedal, to move the clamping devices to their clamping relation, and a second tension rod is employed and operated by a single tensional force, for example by a second foot pedal, to move the clamping devices to their releasing relation.

More specifically, the invention provides a thrust block adjustable on the base of the clamp structure, towards and from a first and stationary jaw member secured to said base, and holding devices for securing said thrust block to said base in any desired adjustment, to adjust the clamp structure for work pieces of different sizes; the invention also provides a first link or links pivotally connected with a second and movable jaw member of the clamp structure, and a second link or links pivotally connected with said first link or links and also pivotally connected with said thrust block, the effective lengths of said links being so taken that when the maximum clamping action is exerted upon said jaw members, the axes of the pivotal connections of said links are substantially in the same plane. Said pivotal connections are preferably pivot rods having cylindrical bearing surfaces engaging respectively the parts connected thereby. A first one of said pivot rods, for example, the pivot rod connecting the adjacent ends of said links, may be provided with cylindrical bearing surfaces that are coaxial; a second one of said pivot rods, for example, the pivot rod connecting the movable jaw member with the adjacent link or links, is provided with cylindrical bearing surfaces that have an eccentric relation to each other, so that turning said second pivot rod in the connected parts, imparts movement of said movable jaw member towards or from said stationary jaw member, determined by the direction of turning said second pivot rod and the amount of its eccentricity, devices being provided for clamping said second pivot rod in desired angular adjustment and against relative turning movement, to one of the parts connected thereby, for example, to the link or links connected by said pivot rod with said movable jaw member; and the third one of said pivot rods, for example, the pivot rod connecting said thrust block with the adjacent link or links, is also provided with cylindrical bearing surfaces that have an eccentric relation to each other, so that turning said third pivot rod in the connected parts, imparts movement of said movable jaw member towards or from said stationary jaw member, determined by the direction of turning said third pivot rod and the amount of its eccentricity, devices being provided for clamping said third pivot rod in desired angular adjustment and against relative turning movement, to one of the parts connected thereby, for example, to said adjacent link or links.

One of said eccentric pivot rods, for example, said third pivot rod, is preferably made with a substantial amount of eccentricity of its bearing surfaces, so that the clamping pressure of said jaw members may be quickly adjusted thereby through a corresponding range of pressures, although this adjustment does not readily lend itself to exact pressure adjustment. The other of said eccentric pivot rods, for example, said second pivot rod, is preferably made with a much smaller amount of eccentricity of its bearing surfaces than the other of said eccentric pivot rods, so that by its adjustment the clamping pressure of said jaw members may readily and accurately be given micrometric adjustment. Thus, for any particular adjustment of said thrust block, said eccentric pivot rods provide a means for readily and exactly securing the most desirable clamping pressure for the work articles then to be held by the clamp structure, as determined by the size, fragility and material of said work articles.

The invention also provides a bracket member secured to said link structure, for example, to one of said first links, and a tension rod connected with said bracket member, so that a tensional force exerted downwardly on said tension rod, for example, by a first-foot pedal, will move said first pivot rod downwardly towards its position of alignment with said second and said third pivot rods, to exert desired clamping pressure by said jaw members. The thrust block is preferably provided with a pivoted releasing member connected with a second tension rod for connection in turn with a second foot pedal, so that the tensional force exerted on said second tension rod by depressing said second foot pedal, will operate said releasing member to raise said first pivot rod above its locked position, thereby releasing said movable jaw member.

Where it is required to hold the work pieces only a short time, the thrust block may be adjusted so that said first pivot rod is not moved down to its locking position, by depressing said first pedal, and that when said first pedal is released, the clamping pressure on said jaw members is also released; in other cases where work pieces must be held for substantial intervals by the clamp structure, and particularly where maximum clamping pressure of the jaw members is required, the thrust block is adjusted so that depressing said first pedal, moves said first pivot rod down to its locking position.

For clamp structures in which the movable jaw member maintains a parallel relation with the stationary jaw member, the base of which the stationary jaw member is a part, or to which it is rigidly secured, is extended perpendicularly to the planes of the jaw members, to support the thrust block and also the movable jaw member, and the thrust block is preferably provided with guide rods or tubes parallel with the extended base and extending into the movable jaw member to maintain the parallelism of the jaw members, retracting springs being preferably provided between the thrust block and the movable jaw member, tending to move said movable jaw member to its open position.

Our invention also includes a modified form of devices for operating the movable jaw members of clamp structures, together with an improved form of the jaw members of such structures for holding work pieces of irregular form, which operating devices include a plurality of sets of toggle links of the general construction described and connecting the movable jaw member with the thrust block of the clamp structure, to distribute the clamping pressure over the working face of the movable jaw member, which is of advantage where jaw members having relatively large working surfaces are required. In this construction, each set of toggle links has the same general construction and advantages as where a single set of toggle links is employed as above described, and in this modified construction, operating devices are employed which simultaneously produce the maximum clamping effect of the several sets of toggle links, and also simultaneously move said sets of links to their releasing position, said common operating devices including coacting toggle members producing the operating pressures required to operate said sets of toggle links. The effect of this compound toggle action, is to produce great clamping pressures, which is of advantage where large work pieces must be held by the clamp structure with such pressures. In this modified construction we also provide a single means for simultaneously adjusting the clamping pressure produced by the several sets of toggle links, with any degree of accuracy of adjustment that may be required in any particular case.

The clamp structures and clamping means may be mounted on machine tools of any kind where the work pieces require machining operations, or on suitable benches where the work pieces require manual operations, the operation of the clamping means being the same in either case.

The object of the invention is to produce clamping means for clamp structures of the kind described, having the construction, operation and advantages described.

Our invention will be best understood by reference to the accompanying drawings illustrating preferred embodiments thereof, in which.

Similar numerals refer to similar parts as shown in the several views.

Figure 1:
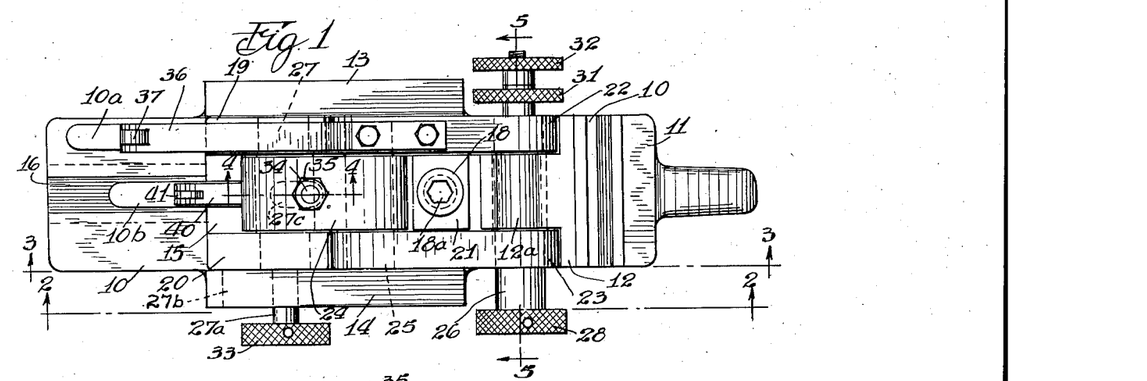
Fig. 1 is a plan view of one form of our improved clamping means and of the clamp structure.
Figure 2:
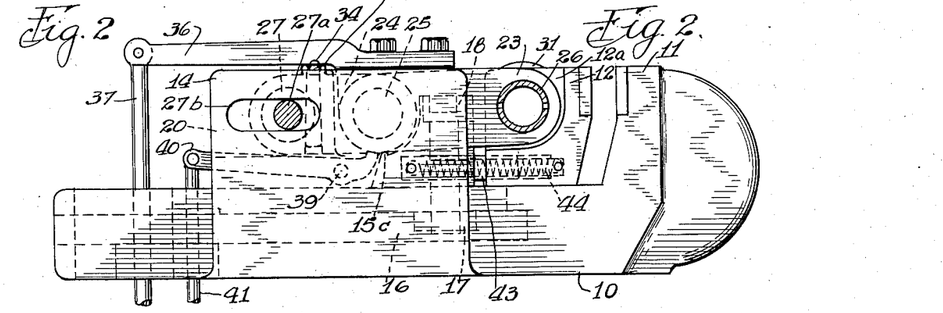
Fig. 2 is front elevation of the structure shown in Fig. 1 with the pressure adjusting rods in vertical, sectional view, taken along the line 2—2 in Fig. 1, the clamping means and clamp structure being shown in clamping position.
Figure 3:
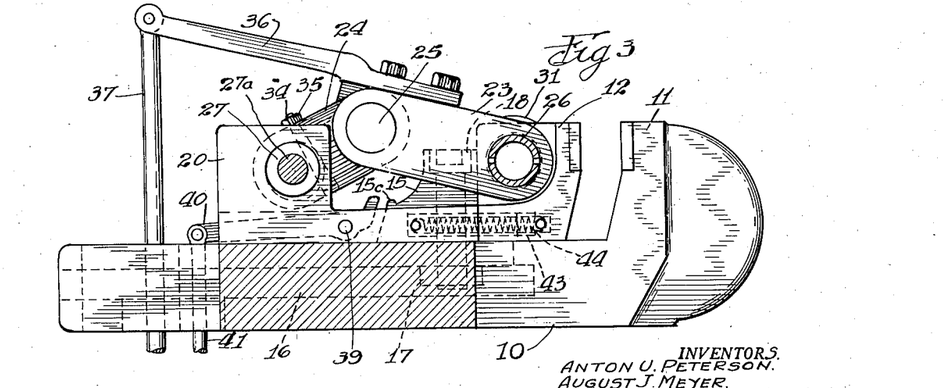
Fig. 3 is a vertical, sectional view of the structure shown in Fig. 1, taken along the line 3—3 in Fig. 1, excepting that in this view the clamping means and the clamp structure are shown in their releasing position.

As shown in Figs. 1, 2 and 3, the clamp structure includes a flat and horizontally disposed base 10 to the right hand end of which, an upwardly extending stationary jaw member 11 is rigidly connected. A movable jaw member 12 is supported on the base 10 for movement towards and from the stationary jaw member 11 and in parallelism therewith.

Figure 6:
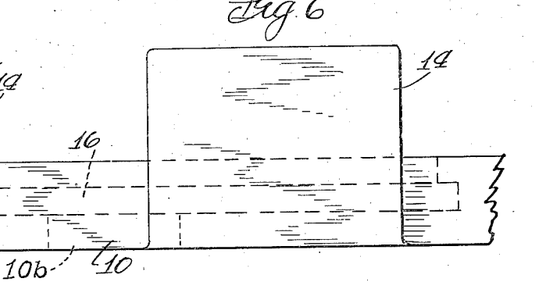
Fig. 6 is a side elevation of the left hand portion of the base of the clamp structure shown in Figs. 1, 2 and 3, with the other parts of the structure removed.
Figure 7:
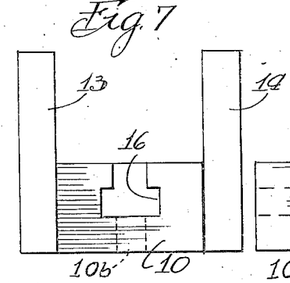
Fig. 7 is an end view of the structure shown in Fig. 6.

The base 10 is provided with upwardly extending parallel side walls 13 and 14 between which a thrust block 15 is mounted on the base for adjusting movement towards and from the stationary jaw member 11. The base 10 is provided with a T-shaped slot 16 (see Figs. 6 and 7), to receive a nut 17 on the lower threaded end of a clamping bolt 18 extending upwardly through the thrust block 15, by which the thrust block may be rigidly secured to the base 10 in any adjusted position. The head of the bolt 18 is provided with a flat sided socket 18a to receive a correspondingly shaped plug wrench to tighten and loosen the bolt 18 as desired.

Figure 8:
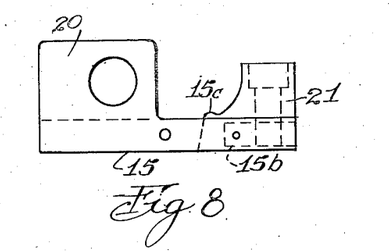
Fig. 8 is a side elevation of the thrust block shown in Figs. 1, 2 and 3, removed from the other structure shown in said figures.
Figure 9:
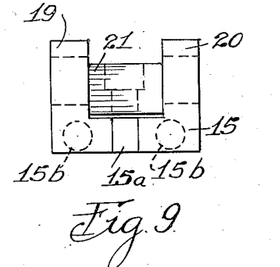
Fig. 9 is an end view of the structure shown in Fig. 8.

The thrust block 15 is provided at its left hand end portion (see Figs. 8 and 9), with upwardly extending side walls 19 and 20 that are a sliding fit between the base walls 13 and 14 to maintain the thrust block in alignment with the base. As shown in Figs. 8 and 9, the thrust block 15 is provided at its right hand end portion, with an upwardly extending post 21 midway between the edges of the thrust block, which post supports the bolt 18.

Figure 5:
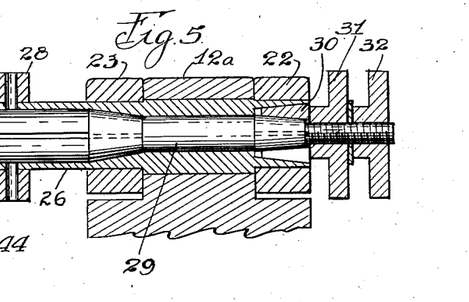
Fig. 5 is a vertical, sectional view to an enlarged scale, through the other of the adjusting rods and adjacent parts, shown in Figs. 1, 2 and 3, taken along the line 5—5 in Fig. 1.

As shown in Figs. 1, 2 and 3, the movable jaw member 12 and the thrust block 15 are connected by toggle links as follows: First links 22 and 23 are pivotally connected with the movable jaw member 12, a second link 24 is pivotally connected with the thrust block 15, and the adjacent ends of the links 22 and 23 and of the link 24 are pivotally connected with each other, the effective lengths of said links being so taken that when maximum clamping pressure is exerted on the jaw members 11 and 12, the axes of said pivotal connections are substantially in a horizontal plane (see Fig. 2), and that for the released condition of said jaw members, the axis of the pivotal connection at the adjacent ends of the links, is a substantial distance above the plane of the axes of the other pivotal connections. Said pivotal connections comprise a first pivot rod 25 through the adjacent ends of said links which pivot rod is cylindrical and may be of uniform diameter throughout, a second pivot rod 26 extending through the other ends of the links 22 and 23 and also through a tongue 12a extending from the movable jaw member 12, and a third pivot rod 27 extending through the other end of the link 24 and also into the side walls 19 and 20. The pivot rod 26 is provided with a central cylindrical bearing surface engaging the tongue 12a and end cylindrical bearing surfaces engaging the links 22 and 23, the central bearing surface being eccentric relatively to the end bearing surfaces and the latter bearing surfaces being coaxial, the amount of said eccentricity being small, so that when the clamping means are otherwise adjusted for a desired clamping pressure on a work piece between the jaw members 11 and 12, the amount of said clamping pressure may be accurately adjusted to exactly the clamping pressure desired by micrometric increments, by turning the pivot rod relatively to both the links 22 and 23 and the tongue 12a. To effect this micrometric adjustment of the clamping pressure, the pivot rod 26 is extended outside of the link 23 and secured to a knob 28; as shown in Fig. 5, the pivot rod 26 is tubular, and within the links 22 and 23, said rod is split and somewhat expansible and is there provided with conical bores diverging respectively towards the ends of said rod, an expanding rod 29 being disposed in the rod 26 and provided with a tapered head fitting the conical bore within the link 23 and at its other end portion having a conical surface converging away from said tapered head and spaced from the conical bore in the rod 26 that is within the link 22; an annular and split wedge member 30 having inner and outer conical surfaces respectively fitting the expanding rod 29 and the conical bore within the link 22, is disposed in the latter conical bore, and from a point a short distance within the outer end of the wedge member 30, the expanding rod 29 is of reduced diameter and continued outwardly in cylindrical and threaded form to receive internally threaded knobs 31 and 32, the inner knob 31 having a hub of somewhat smaller diameter than the outer end of the wedge member 30 and bearing against said outer end. By means of the construction described, when the knobs 31 and 32 are unscrewed, the pivot rod 26 may be turned by the knob 28 to accurately and by minute increments adjust the clamping pressure of the jaw members 11 and 12 on a work piece, and when the desired pressure adjustment is secured, the knob 31 is tightened against the wedge member 30, thereby expanding and locking the pivot rod 26 against the links 22 and 23, but at the same time permitting free angular movement of the pivot rod 26 in the tongue 12a; the pressure adjustment thus secured, is maintained, by turning the knob 32 to press tightly against the knob 31.

Means are provided for quickly and approximately adjusting the clamping pressure effected by the jaw members 11 and 12 as follows. The end portions of the pivot rod 27 are cylindrical and coaxial for free turning movement in the side walls 19 and 20 of the thrust block 15. The mid-portion of the pivot rod 27 is cylindrical and eccentrically disposed relatively to the end portions of said pivot rod, said mid-portion when released, being a turning fit in the link 24 and the amount of said eccentricity being substantial. At the front of the clamp structure, the pivot rod 27 is continued with reduced diameter at 27a, through the base side wall 14 and has secured to its projecting end, an adjusting knob 33. As more clearly shown in Fig. 4, the mid-portion of the pivot rod 27 is provided with an annular groove 27c to receive a tapered pin 34 extending through the link 24, the pin 34 having such relation to the groove 27c, that when the pivot rod 27 is given any desired pressure adjustment by turning the knob 33, tightening the nut 35 threaded on the projecting and smaller end of the pin 34, tightly presses the pin against the pivot rod 27 and locks said pivot rod against angular movement relatively to the link 24.

Figure 4:
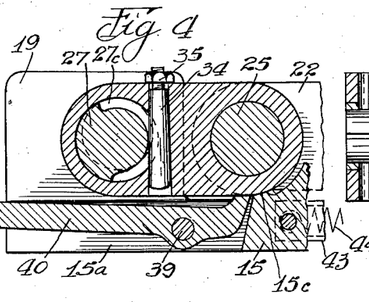
Fig. 4 is a vertical, sectional view to an enlarged scale, through one of the adjusting rods and adjacent parts shown in Figs. 1, 2 and 3, taken along the line 4—4 in Fig. 1.
Figures 10, 11:
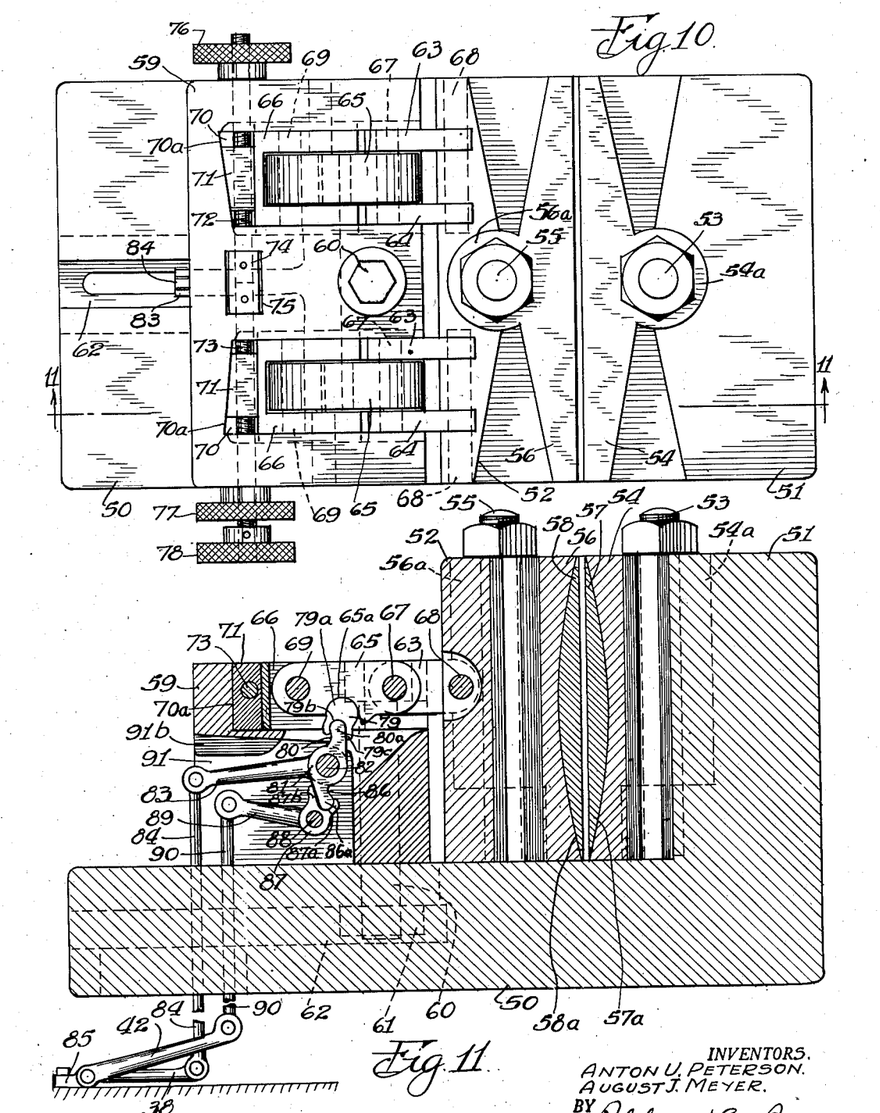
Fig. 10 is a plan view of a modified form of clamp structure and clamping means for operating it.
Fig. 11 is a vertical, sectional view of the structure shown in Fig. 10, taken along the line 11—11 in Fig. 10.

To forcibly move the pivot rod 25 downwardly substantially into horizontal axial alignment with the pivot rods 26 and 27, to produce the desired clamping pressure on a work piece between the jaw members 11 and 12, the link 22 has rigidly secured thereto an arm 36 extending over the left hand end portion of the base 10, said arm having pivotally connected with its projecting end, a downwardly extending tension rod 37 (Figs. 2 and 3), for connection at its lower end with a suitable foot pedal, for example, of the kind shown at 38 in Fig. 11. As shown in Fig. 4, the thrust block 15 has pivotally connected therewith at 39, a releasing arm 40 having an upwardly extending right hand end for engaging the link 24 below the pivot rod 25. The releasing arm 40 is mounted in a slot 15a therefor, above and in alignment with the slot 16 in the base 10, said arm being pivotally connected at its left hand end (see Figs. 2 and 3), with a downwardly extending tension rod 41 for connection at its lower end with a suitable foot pedal, for example, of the kind shown at 42 in Fig. 11. Clearance slots 10a and 10b for the rods 37 and 41 respectively, are formed through the base 10 to permit adjustment of the thrust block 15 to different positions on the base 10, to clamp work pieces of different sizes, as desired, and the base side wall 14 is provided with a clearance slot 27b for the end portion 27a of the pivot rod 27, for the same purpose.

To maintain the movable jaw member 12 in parallel relation with the stationary jaw member 11, the thrust block 15 is provided with bores 15b, 15b (Figs. 8 and 9), extending in the direction of adjusting movement of said thrust block, to receive with a tight fit, the ends of tubular leader pins 43 (see Figs. 2, 3 and 4), the other ends of which leader pins enter with a sliding fit, corresponding bores in the movable jaw member 12. Retracting springs 44 are contained in the leader pins and are held under tensional stress by pin connections at their ends with the said thrust block and said movable jaw member, to move the movable jaw member 12 from the stationary jaw member 11, when the pivot rod 25 is raised from its locked clamping position shown in Fig. 2 to its released position shown in Fig. 3, by the operation of the releasing arm 40.

As shown in Figs. 2, 3 and 4, the thrust block 15 is provided with a stop lug 15c for limiting downward movement of the pivot rod 25, when said pivot rod reaches a position just below axial alignment with the pivot rods 26 and 27, thereby establishing a locked condition of maximum clamping pressure, for the pressure adjustments of the pivot rods 26 and 27 that may at the time be in effect.

The structure illustrated in Figs. 1–9, inclusive, is operated as follows: With the pivot rods 26 and 27 preferably in mid-positions in their ranges of pressure adjustment, the bolt 18 is loosened and the thrust block 15 and movable jaw member 12 are moved on the base 10, to receive work pieces of the particular size to be worked upon, this adjustment being such that the work pieces will be clamped between the jaw members, when the clamping arm 36 is in its lowermost position, and the bolt 18 is then tightened to maintain this adjustment. Then the nut 35 and pin 34 are loosened, and the knob 33 is turned to adjust the clamping pressure to approximately the amount desired, depending upon the material of the work pieces and the operation or operations to be performed on the work pieces, and then the nut 35 is tightened to maintain said approximate pressure adjustment. Then the knobs 31 and 32 are turned to releasing position and the knob 28 is then carefully turned to secure exactly the desired amount of clamping pressure, the knob 31 is then tightened to hold the pivot rod 26 in said exact pressure adjustment, and then the knob 32 is screwed tightly against the knob 31 to prevent accidental release of said knob 31.

For the adjustments described, when the pivot rod 25 is moved to its lowermost position against the stop lug 15c, the movable jaw member is locked in its position of maximum clamping pressure provided for by said adjustments, until the work piece then clamped between the jaw members 11 and 12 is released by operation of the releasing arm 40, thereby relieving the workman of any thought about maintaining said clamping action, while he is performing the desired operations on the clamped work piece. In cases where the operation to be performed on the work pieces is of short duration, or where the work pieces differ in size by a small amount, the thrust block 15 may be placed somewhat nearer the stationary jaw member 11 than required for maximum clamping pressure, and held in that position by tightening the bolt 18, in which case the clamping pressure is maintained on the work piece only for such a length of time as a downward force is exerted on the clamping rod 37, the clamping action on the work piece being relieved as soon as said downward force is interrupted. It will be noted that as a result of the toggle action of the links 22, 23 and 24 in approaching their position of maximum clamping pressure, where the nature of the work pieces permits of applying great clamping pressures to them, said clamping pressure may readily be made from ten to twenty times the clamping force exerted downwardly on the rod 37; in fact, the possible clamping force is so great that care should be taken to construct the parts of the clamp structure of sufficient strength to safely withstand it without damage to said structure.

The structure described is particularly useful where many work pieces of the same kind and size must be operated upon, for example, in quantity production, either where said operations are manual and at a work bench, or where said operations are performed in machine tools by power.

In Figs. 10 to 21, inclusive, we illustrate a modified form of clamp structure and clamping means, having the same general principles of construction and operation as the structure shown in Figs. 1 to 9, inclusive, an important difference being that the structure of Figs. 10 to 21, inclusive, is adapted to much heavier and more severe service than is the structure of Figs. 1 to 9, inclusive.

As shown in Figs. 10 and 11, the clamp structure includes a stationary jaw member 51 rigidly secured to a base 50, and a movable jaw member 52 mounted on said base for movement towards and from the jaw member 51. The stationary jaw member 51 is provided with a vertical stud 53 extending through a boss 54a carried by a rocking plate 54 so that said plate may turn freely a limited amount on the vertical stud 53 to accommodate work pieces having irregular or non-parallel opposite sides. The movable jaw member 52 is provided with a similar stud 55 extending through a similar boss 56a on a similar rocking plate 56, for the same purpose. Suitable clearance spaces are provided between the rocking plates 54 and 56 respectively and the jaw members 51 and 52 to permit said free turning movement on the studs 53 and 55. The bosses 54a and 56a are provided with cylindrical surfaces coaxial with the studs 53 and 55 and fitting in corresponding bores in the jaw members 51 and 52 respectively, for free turning movement of the rocking plates on said studs.

As shown in Fig. 11, the work supporting face of the rocking plate 54, is cylindrical around a horizontal axis as shown at 57a, and is in sliding engagement with a similarly curved surface of a vertically movable plate 57, so that vertical irregularities of small amount on the engaged surfaces of work pieces will be compensated for by corresponding vertical movement of the plate 57 relatively to the rocking plate 54. The rocking plate 56 is provided with a similar cylindrical surface 58a engaging a similarly formed plate 58 for the same purpose. The adjacent surfaces of the plates 57 and 58 are preferably plane surfaces and parallel with each other when said plates are in their mid-positions on the plates 54 and 56 respectively and said plates 54 and 56 are in their mid-positions on the studs 53 and 55, to engage and clamp work pieces placed between them.

As shown in Figs. 10 and 11, a thrust block 59 is mounted on the base 50 for movement towards and from the stationary jaw member 51 according to the sizes of the work pieces to be operated upon, a bolt 60 extending through said thrust block into a nut 61 in a T-shaped slot 62 extending longitudinally in the base 50, for rigidly securing said thrust block to said base in desired adjustment.

As shown in Fig. 10, the movable jaw member 52 is connected with the thrust block 59 by two sets of toggle links, each of which sets includes first links 63 and 64 pivotally connected with the jaw member 52, and a second link 65 pivotally connected with a pressure adjusting shoe 66 (shown in Figs. 16 and 17) and carried by the thrust block 59, the adjacent ends of the links 63 and 64 and of the link 65 being pivotally connected with each other, the effective lengths of said links being so taken that when maximum clamping pressure is exerted on the plates 57 and 58, the axes of said pivotal connections are substantially in a horizontal plane as shown in Fig. 11, and that for the released condition of said clamping pressure, the axis of the pivotal connection at the adjacent ends of said links, is a substantial distance below the plane of the axes of the other pivotal connections. Said pivotal connections comprise a first cylindrical pivot rod 67 through the adjacent ends of said links, a second cylindrical pivot rod 68 through the other ends of the links 63 and 64 and extending into a suitable bore therefor in the movable jaw member 52, and a third cylindrical pivot rod 69 extending through the other end of the link 65 and into suitable bores therefor in the side walls of the shoe 66.

Each of the shoes 66 is contained in a guideway 70 therefor in the upper portion of the thrust block 59 to hold said shoe in operative position and to guide the same when said shoe is moved relatively to the thrust block as below described, towards and from the stationary jaw member 51 to adjust the clamping pressure effected by the toggle links. Each of the guideways 70 is continued beyond the left hand end of its shoe 66 to contain a pressure adjusting wedge 71 between the shoe and the left hand end wall 70a of the guideway which is inclined laterally of the thrust block to fit said wedge. A wedge-adjusting rod consisting of the portions 72 and 73 extends horizontally and transversely through suitable clearance bores in the thrust block 59, said rod portions being provided with reversely inclined threads of the same pitch engaging correspondingly threaded bores in the wedges 71, said rod portions at their adjacent ends being rigidly connected by a tubular coupling member 74 contained in a recess 75 therefor in the thrust block, which fits the ends of said coupling member. The rod portion 72 extends beyond the far side of the thrust block 59 and has threaded engagement with a knob 76 thereon, and the rod portion 73 extends beyond the near side of the thrust block and has threaded engagement with a knob 77 thereon, said rod portion 73 being extended beyond the knob 77 and having rigidly secured thereto a second knob 78. The wedges 71, 71 are of the same angle and reversely arranged, so that turning the knob 78 in one direction moves said wedges towards each other to simultaneously move the links 65, 65 to the right relatively to the thrust block to increase the clamping pressure effected by the jaw members, and turning the knob 78 in the opposite direction moves said wedges away from each other to simultaneously reduce the clamping pressures exerted on the links 65, 65 by equal amounts. In adjusting the clamping pressures to a desired amount, the knobs 76 and 77 are turned to their released position, the knob 78 is then turned until the desired pressure adjustment is secured, and then the knobs 76 and 77 are turned to press tightly against the thrust block, thereby preventing accidental turning of the rod portions 72 and 73. The range of pressure adjustment provided for by the structure just described, is determined by the angle of the wedges 71, 71, and the degree of accuracy with which a particular clamping pressure may be secured is determined by the fineness of the threads on the rod portions 72 and 73, which threads in any event are preferably of the same pitch. Where a relatively small range of pressure adjustment is sufficient, the wedges 71, 71 may be of small angle, and if at the same time the rod portions 72 and 73 are provided with threads of small pitch, micrometric adjustment of the clamping pressure may accurately be secured.

As shown in Fig. 11, the thrust block 59 is recessed to contain the sets of toggle links described, and to permit the pivot rods 67, 67 to be depressed sufficiently to release the clamping pressure on the jaw members so that a completed work piece may be removed and a new work piece may be inserted between the plates 57 and 58 carried by the jaw members.

As also illustrated in Fig. 11, the lower portion of each of the links 65 is provided with a cylindrical bore 65a parallel with the pivot rods 67 and 69 and opening through the lower surface of the link 65, containing with a free turning fit the cylindrical upper end 79a of a short and vertically disposed link 79 having a cylindrical bore 79b in its lower end parallel with the cylindrical end 79a, which bore 79b contains with a free turning fit, the upper cylindrical end 80a of a short arm 80 extending upwardly from and rigidly secured to a horizontal tubular shaft 81 mounted on a bearing rod 82 having its ends supported in suitable bores in the opposite side walls of the thrust block 59. The bore 65a embraces more than one-half of the circumference of the cylindrical end 79a, and the bore 79b embraces more than one-half of the circumference of the cylindrical end 80a, as a result of which each of said cylindrical ends is retained in the bore engaging it. Midway between its ends, the shaft 81 has rigidly secured thereto a horizontally disposed operating arm 83 extending to the left from the shaft 81, which arm is pivotally connected at its outer end with the upper end of a tension rod 84, the lower end of which is pivotally connected with a foot pedal 38 pivotally mounted on any suitable stationary support, by a block 85. The parts described are so made and proportioned, that turning the shaft 81 in a counter-clockwise direction by a downward thrust on the rod 84, starting with the arm 83 in its upper position, turns the link 79 in a clockwise direction relatively to the link 65, thereby moving the arm 80 and the link 79 to substantially vertical positions as shown in Fig. 11 and at the same time moving the arm 83 to the position shown in Fig. 11. This imparts maximum upward pressure on the link 65 and places the axis of the pivot rod 67 in the plane of the axes of the pivot rods 68 and 69 or slightly above said plane, thereby exerting the maximum clamping pressure on a work piece between the plates 57 and 58 then made possible by the adjustment then existing of the thrust block 59 and of the wedges 71. A lip 79c on the link 79, by its engagement with the arm 80, limits the clamping movement of the parts, to that above described.

Figure 22:
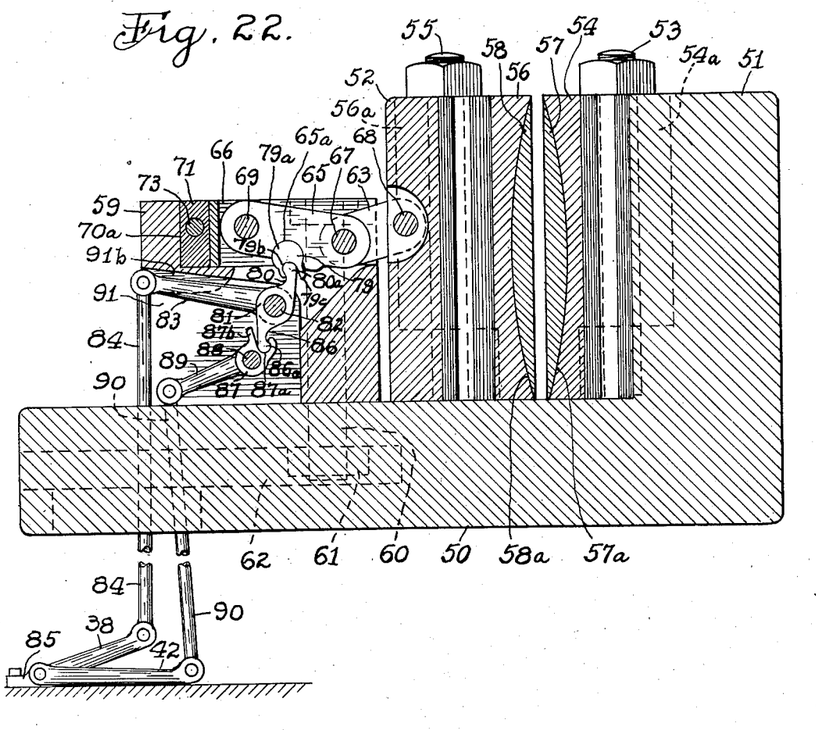
Fig. 22 shows in a view similar to Fig. 11, the device of the latter figure in released position.

Below each of the arms 80, the shaft 81 has rigidly secured thereto a short downwardly extending arm 86 having a lower cylindrical end 86a parallel with the cylindrical end 80a on the arm 80, which cylindrical end 86a is held with a free turning fit in a cylindrical bore 87a carried by and opening through the upper surface of a tubular shaft 87 containing a bearing rod 88 extending at its ends beyond the shaft 87 and into bores therefor in the side walls of the thrust block 59, to mount the shaft 87 in a position parallel with and below the shaft 81 and for turning movement to depress the pivot rod 67 and release the clamping pressure on the work piece then between the plates 57 and 58. The bore 87a embraces more than one-half of the circumference of the cylindrical end 86a which prevents disengagement of the parts from each other. A radial clearance is provided in the bore 87a for the cylindrical end 86a to permit the angularity of relative movement of said parts when the shafts 81 and 87 are operated. The shaft 87 is provided with a stop lip 87b engaging the arm 86 when the shaft 81 is turned to the maximum clamping position illustrated in Fig. 11, thereby cooperating with the stop lip 79c to stop said turning movement of the shaft 81 when said clamping position is reached. The shaft 87 has rigidly secured thereto midway between its ends, a horizontally extending operating arm 89 pivotally connected at its outer end with the upper end of a tension rod 90, which is pivotally connected at its lower end with a foot pedal 42 pivotally mounted on any suitable stationary support, for example, by means of the block 85. As a result of the construction just described, depressing the foot pedal 42 to the position indicated in Fig. 22, turns the shaft 87 in a counter-clockwise direction, which turns the shaft 81 in a clockwise direction, thereby in the manner above described, moving the links 65, 65 downwardly to release the work piece then clamped between the plates 57 and 58 and at the same time raising the arm 83 and the foot pedal 38 to their upper positions, ready for the next clamping operation.

The shafts 81 and 87 are of the same length, this length being equal substantially to the distance between the inner surfaces of the outer legs of the shoes 66, 66 when they are in the guideways 70, 70 therefor in the thrust block 59. Each link 65 is preferably of a width fitting between the legs of the corresponding shoe 66 with a sliding fit, and each short link 79 preferably has a width axially of its cylindrical end, substantially equal to said width of the link 65, the width of each arm 80 axially of the shaft 81 also being preferably substantially equal to said width of the link 65. The parts described between each of the links 65 and the shaft 81 are of the same construction and arrangement, as a result of which, clamping movement of the shaft 81 in a counter-clockwise direction, imparts clamping pressures to the jaw members by the two sets of toggle links, that are substantially equal to each other.

Figures 12, 13, 14:
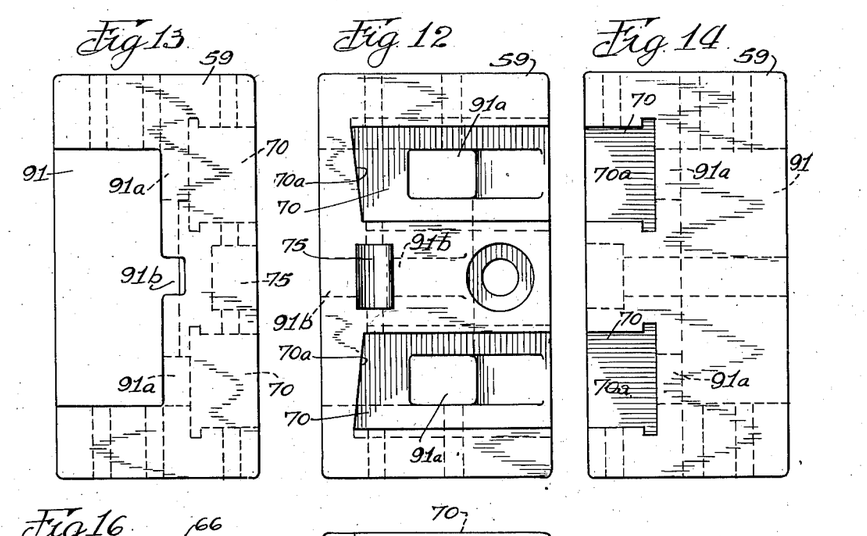
Fig. 12 is a plan view of the thrust block shown in Figs. 10 and 11, with the other parts of the structure removed.
Fig. 13 is left hand side view of the structure shown in Fig. 12.
Fig. 14 is a right hand said view of the structure shown in Fig. 12.
Figures 15, 16, 17, 18, 19, 20, 21:
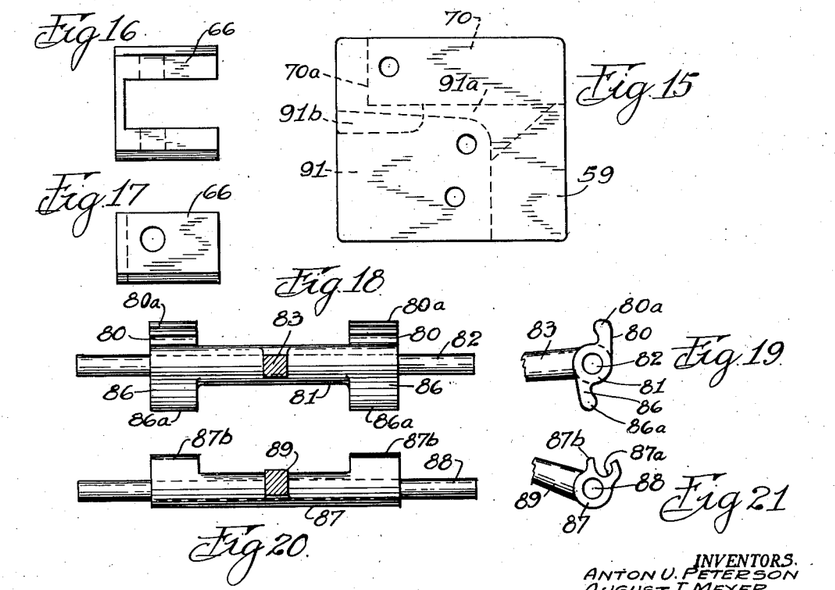
Fig. 15 is a front elevation of the structure shown in Fig. 12.
Fig. 16 is a top view of one of the pressure and bearing shoes shown in Figs. 10 and 11.
Fig. 17 is a front elevation of the structure shown in Fig. 16.
Fig. 18 shows in side elevation the clamping shaft used in Figs. 10 and 11.
Fig. 19 is a right hand end view of the structure shown in Fig. 18.
Fig. 20 shows in side elevation the clamp-releasing shaft used in Figs. 10 and 11.
Fig. 21 is a right hand end view of the structure shown in Fig. 20.

The shafts 81 and 87 are mounted in parallel relation and parallel with the pivot rods 67 and 69, in a recess 91 therefor in the lower portion of the thrust block 59, which recess has a width between the side walls of said block, as more clearly shown in Figs. 12, 13 and 14, substantially equal to the length of said shafts. Clearance openings 91a, 91a are formed in the thrust block 59 from the recess 91 into the guideways 70, 70 to receive the links 79, 79 and the arms 80, 80 respectively. Midway between the side walls of the thrust block 59, the recess 91 is provided with a clearance groove 91b extending perpendicularly to the axes of the shafts 81 and 87 when assembled in said thrust block, to permit said arm 83 to assume its uppermost, or pressure releasing position. The construction of the shafts 81 and 87 will be more clearly understood by reference to Figs. 18, 19 and to Figs. 20, 21 respectively.

From the description of the construction of Figs. 10 and 11, it will appear that the structure there shown, not only provides a plurality of sets of toggle links for exerting distributed clamping pressures on the jaw members of a clamp structure, but that in addition, each set of toggle links includes a structure having a double or compound toggle action in exerting maximum clamping pressure, as follows. The action described for exerting maximum clamping pressure by means of each set of links 63, 64 and 65, by raising the pivot rod 67 until its axis is substantially in a plane through the axes of the pivot rods 68 and 69, presents a first toggle action by which large clamping pressures may be produced with much smaller operating pressures, in a manner comparable with the clamping operation described in connection with Figs. 1, 2 and 3; in connection with the structure of Figs. 10 and 11, however, additional means are provided for imparting large operating pressures to each set of toggle links, by exerting relatively small operating pressures on said additional means. In exerting maximum clamping pressure with this structure, by means of each of the sets of toggle links, the turning of the arm

80 by the shaft 81, moves the axis of the cylindrical end 80a of said arm, towards a plane through the axis of the shaft 81 and also through the axis of the cylindrical end 79a of the short link 79; this movement progressively increases the lifting pressure exerted on the link 65 by the link 79, for the same amount of turning effort exerted on the shaft 81, until, when the axis of the end 80a is nearly in alignment with the axes of the shaft 81 and of the end 79a, the lifting force exerted on the link 65 is very large compared with the operating pressure that can be comfortably exerted on the pedal 38 by a workman; the large lifting pressure on the link 65 which is thus available becomes the operating pressure on the link system 63, 64 and 65, and is thereby multiplied many times by the toggle action of that link system, with the result that by means of the two-fold or compound toggle action of the structure illustrated in Figs. 10 and 11, enormous clamping pressures may readily be produced by the application of operating pressures that can readily be furnished by a workman.

Among the advantages of our improved clamping devices may be noted the rapidity with which they may be operated, the simplicity of their application, the facility with which they may be adjusted for work pieces of different sizes, the accuracy with which they may be adjusted for critical clamping pressures, and the enormous clamping pressures that may readily be secured by them.

While we have shown our invention in the particular embodiments described, it will be understood that we do not limit ourselves thereto as we may employ equivalents thereof without departing from the scope of the appended claims.

What we claim is:

1. Clamping means for vises and the like, including in combination a base, a first jaw member carried by said base, a second jaw member mounted for movement towards and from said first jaw member, a thrust block carried by said base, a plurality of sets of toggle links pivotally connected to said thrust block and to said movable jaw member for operating the latter, a common operating member, and similar operating connections between said operating member and each of said sets of toggle links, whereby all of said sets of toggle links are simultaneously and similarly operated by operation of said operating member, said operating member comprising a rotary shaft carried by said thrust block, and said operating connections comprising pressure-multiplying links between said shaft and each of said sets of toggle links.

2. Clamping means for vises and the like, including in combination a base, a first jaw member carried by said base, a second jaw member mounted for movement towards and from said first jaw member, a thrust block carried by said base, a plurality of sets of toggle links pivotally connected to said thrust block and to said movable jaw member for operating the latter, a common operating member, and similar operating connections between said operating member and each of said sets of toggle links, whereby all of said sets of toggle links are simultaneously and similarly operated by operation of said operating member, said operating member comprising a rotary shaft carried by said thrust block, and said operating connections comprising an additional toggle link structure between said shaft and each of said sets of toggle links, said additional toggle link structures being similar to each other and simultaneously exerting substantially equal operating forces respectively on said sets of toggle links.

3. Clamping means for vises and the like, including in combination a base, a first jaw member carried by said base, a second jaw member mounted for movement towards and from said first jaw member, a thrust block carried by said base, a plurality of sets of toggle links pivotally connected to said thrust block and to said movable jaw member for operating the latter, a common operating member, similar operating connections between said operating member and each of said sets of toggle links, whereby all of said sets of toggle links are simultaneously and similarly operated by operation of said operating member, a common releasing member, and similar releasing connections between said releasing member and each of said sets of toggle links, whereby all of said sets of toggle links are simultaneously moved to their pressure releasing positions by operation of said releasing member, said operating member comprising a first rotary shaft carried by said thrust block, and said operating connections comprising pressure-multiplying links between said first shaft and each of said sets of toggle links, said releasing member comprising a second rotary shaft carried by said thrust block, and said releasing connections comprising a connection between said first and second shafts turning said first shaft in the reverse direction to that involved in applying operating pressure to said sets of toggle links, and the connections between said first shaft and said sets of toggle links acting during the releasing operation as releasing connections moving said sets of toggle links to their pressure-releasing positions.

4. Clamping means for vises and the like, including in combination a base, a first jaw member carried by said base, a second jaw member mounted for movement towards and from said first jaw member, a thrust block carried by said base, a plurality of sets of toggle links pivotally connected to said thrust block and to said movable jaw member for operating the latter, a common operating member, similar operating connections between said operating member and each of said sets of toggle links, whereby all of said sets of toggle links are simultaneously and similarly operated by operation of said operating member, and pressure adjusting means carried by said thrust block and including a device engaging each of said sets of toggle links and having a conformation and movement relative to said thrust block changing by small increments the position of the associated set of toggle links relative to said thrust block and towards and from said first jaw member, and a single actuating member operatively engaging said pressure adjusting devices for simultaneously increasing or decreasing the clamping pressures exerted by said sets of toggle links as desired, whereby the pressure on a work piece between said jaw members may be accurately adjusted.

5. Clamping means for vises and the like, including in combination a base, a first jaw member carried by said base, a second jaw member mounted for movement towards and from said first jaw member, a thrust block carried by said base, a plurality of sets of toggle links pivotally connected to said thrust block and to said movable jaw member for operating the latter, a common operating member, similar operating connections between said operating member and each of said sets of toggle links, whereby all of said sets of toggle links are simultaneously and similarly operated by operation of said operating member, said thrust block being adjustable on said base towards and from said first jaw member to clamp work pieces of different sizes between said jaw members, devices for rigidly securing said thrust block to said base in any said adjustment, a bearing shoe connected to each of said sets of toggle links and carried by said thrust block for pressure-adjusting movement towards and from said first jaw member, a wedge between each of said bearing shoes and said thrust block and movable to effect said pressure-adjusting movement of the associated bearing shoe, and a threaded and rotary rod carried by said thrust block and engaging said wedges to move said bearing shoes in the same direction by turning said threaded rod, whereby the pressure on a work piece between said jaw members may be accurately adjusted.

ANTON U. PETERSON.
AUGUST J. MEYER.

REFERENCES CITED

The following references are of record in the file of this patent:

UNITED STATES PATENTS

| Number | Name | Date |
|---|---|---|
| 234,930 | Stephens | Nov. 30, 1880 |
| 457,419 | Long | Aug. 11, 1891 |
| 486,723 | Loss | Nov. 22, 1892 |
| 557,453 | Thompson | Mar. 31, 1896 |
| 1,092,145 | Hakes | Apr. 7, 1914 |
| 1,292,930 | Unger | Jan. 28, 1919 |
| 1,321,627 | Hagstrom | Nov. 11, 1919 |
| 1,421,065 | Callan | June 27, 1922 |
| 1,577,744 | Gould et al. | Mar. 23, 1926 |
| 1,623,045 | Butt | Apr. 5, 1927 |
| 1,924,742 | Linder | Aug. 29, 1933 |

FOREIGN PATENTS

| Number | Country | Date |
|---|---|---|
| 104,295 | Germany | July 12, 1899 |